July 3, 1956 — C. B. SEEM — 2,752,866
DOUGH DIVIDER

Filed April 17, 1953 — 3 Sheets-Sheet 1

INVENTOR.
Charles B. Seem.
BY Otto Moeller
ATTORNEY

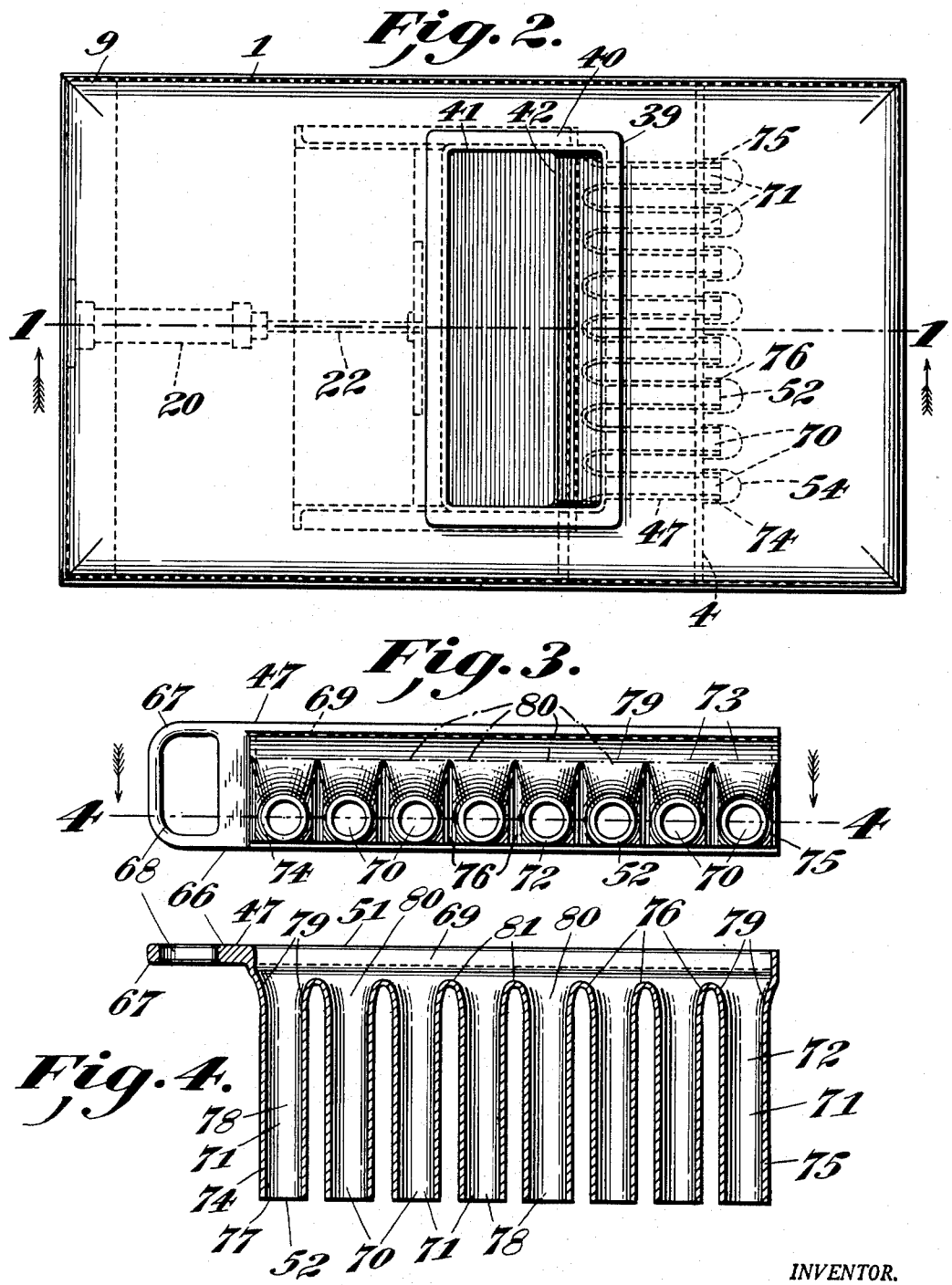

July 3, 1956
C. B. SEEM
2,752,866
DOUGH DIVIDER
Filed April 17, 1953
3 Sheets-Sheet 3
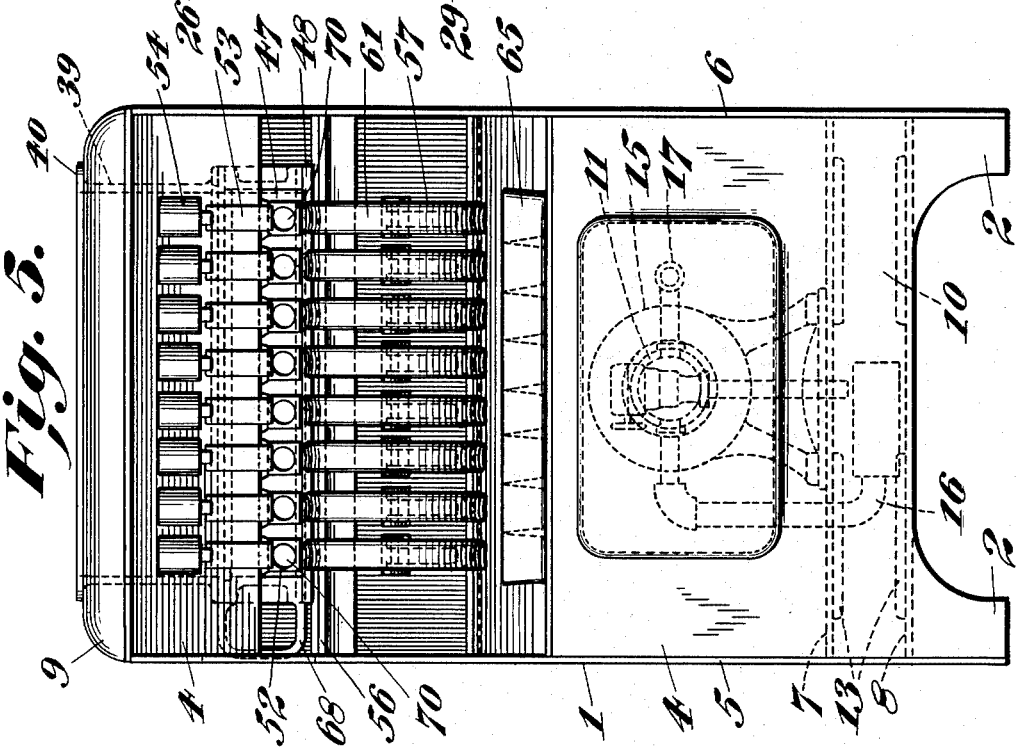
INVENTOR.
Charles B. Seem.
BY
Otto Moeller
ATTORNEY United States Patent Office 2,752,866
Patented July 3, 1956

2,752,866

DOUGH DIVIDER

Charles B. Seem, Zionsville, Pa.

Application April 17, 1953, Serial No. 349,464

3 Claims. (Cl. 107—15)

My invention relates broadly to improvements in bread dough handling apparatus and more particularly to an improved machine for dividing, molding, and weighing bread dough.

The present invention is a continuation in part of my co-pending application filed April 18, 1949, Serial No. 88,111.

In present day bread dough dividers, a system called the volumetric system is used to form loaves of dough of approximate standard weight. In the volumetric system, the dough is forced into so-called scaling pockets at an approximate pressure of from twenty to forty pounds per square inch, at the same time shearing the dough on five sides of the cube of a dough piece, the object being to forcibly eject the gaseous bubbles from the dough so that the varying expansion factors will be eliminated and a standard material weight of loaf can be obtained. The severe punishment given the dough in the volumetric type of machine liberates a large portion of the gases from the dough, and makes further steps necessary to revive the dough before it is baked. The first step after ejecting the loaf from the divider in the volumetric system is to put the dough in a rounder to seal up the raw sides which have been produced by the shearing of the dough; the next step is to place the dough in a proofer and keep it therein until it has recuperated, that is, until it has generated sufficient gaseous bubbles to replace those forced out in the divider; the next step is to place the dough in a molder which shapes the pieces for panning.

In the improved machine comprising my invention, the dough receives very little punishment, but is divided, molded and weighed to exact weights and deposited into the pans, making unnecessary the three steps and the use of the three pieces of auxiliary equipment described above. The rounder is eliminated as no raw edges are left on the dough in its passage through my improved dividing head; the proofer is eliminated as the gas bubbles have not been expelled from the dough in its passage through my improved dividing head; and the molder is eliminated because the dough is molded as it passes through the improved dividing head of my machine.

The machine of the present invention is adapted to divide and mold either heavy or stiff dough as well as soft dough. That is in the present invention one divider head may be substituted for another wherein the divider heads may have a different ratio relationship between the areas of the entrance and discharge openings. The use of different divider heads is determined by the type of dough that is to be molded and divided as it has been ascertained that with a stiff dough it is preferable to use a divider head having a certain ratio relationship between the area of the entrance and the area of the discharge opening of the divider head, while with a soft dough another divider head having a different ratio relationship between the entrance and discharge openings might be preferred.

One of the objects of my invention is to provide an improved machine for dividing, molding, and scaling bread dough into loaves of conventional size and weight with a minimum of punishment to said dough and with a minimum of disturbance to the gaseous bubbles distributed throughout the dough.

Another object of my invention is to provide an improved machine for dividing and molding and scaling bread dough into loaves of conventional size and weight with a minimum of cutting of said dough, thus minimizing the escape of the gaseous bubbles contained in said dough.

Another object of my invention is to provide an improved molding and dividing head which is adapted to divide a mass of bread dough into a plurality of sections, and simultaneously knead, fold, and seal said dough sections while the dough is being pushed through said dividing and molding head.

Another object of my invention is to provide a dough molding and dividing head which is adapted for use with relatively stiff or heavy dough as well as soft dough for dividing the dough into a plurality of sections while kneading, folding and sealing the sections of dough.

Other objects and advantages more or less ancillary to the foregoing and the manner in which all of the various objects are realized will appear in the following description which, considered in connection with the accompanying drawing, sets forth the preferred embodiment of the invention.

Referring to the drawing wherein the preferred embodiment of the invention is illustrated:

Figure 2 is a top plan view of the machine of my invention;

Figure 3 is a front elevational view of my novel dividing and molding head wherein there is shown for purposes of illustration a ratio relationship between the areas of the entrance and discharge openings;

Figure 4 is a section taken along line 4—4 of Figure 3 in the direction indicated by the arrows;

Figure 5 is a front elevation of my novel machine; and

Figure 6 is a diagrammetic view showing an arrangement for operating my machine hydraulically.

Figure 1:
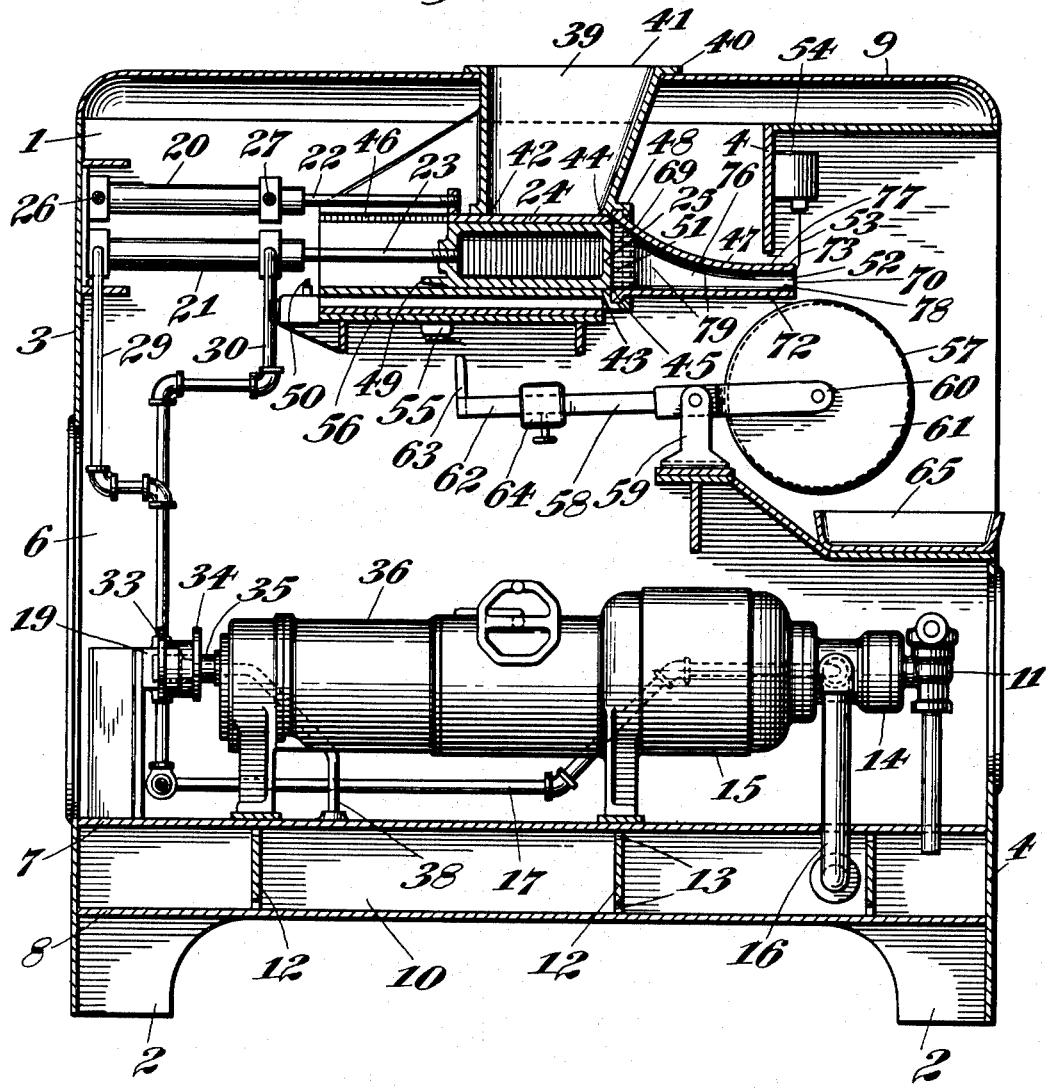
Figure 1 is a vertical cross section of a machine constructed according to my invention taken along line 1—1 of Figure 2 in the direction indicated by the arrows.

Referring to the drawings more in detail, 1 designates a box-like structure comprising a housing to support the various elements of my improved machine. Said housing comprises feet 2, backwall 3, front wall 4, side walls 5 and 6, floor members 7 and 8, and cover 9. Floor members 7 and 8 constitute a tank 10 for storage of oil or other liquid for the hydraulic pumping unit 11 which is mounted on floor member 7. Reenforcing members 12 are provided intermediate members 7 and 8. The members 12 are provided with orifices 13 at the upper and lower extremities thereof to allow free access of the oil to all parts of the tank 10. Pumping unit 11 comprises a pump 14 and a motor 15 operatively connected to said pump 14 to actuate said pump 14 to pump oil or liquid from the supply tank 10. A pipe 16 connects the pump 14 to the tank 10. Pipe 17 connects said pump 14 to four-way cam-operated valve 18 and conveys oil under pressure to said valve 18, see Figure 6, and to four-way cam-operated valve 19 located at the end of the pumping unit 11 opposite pump 14. Hydraulic cylinders 20 and 21 are mounted adjacent the top of the housing and are provided with pistons 22 and 23, respectively, the piston 22 being connected to the hopper knife 24 and piston 23 being connected to the reciprocating dough pushing plunger 25. One end of the pipes 26 and 27 are connected to the rearward and forward ends, respectively, of hydraulic cylinder 20, the other end of the pipes being connected to the four way cam-operated valve 18, and oil is conducted to and from said cylinder 20 by said pipes 26 and 27. In a similar manner, pipes 29 and 30 are connected to valve 19 and cylinder 21. Valves 18 and 19 are reversing being provided with plungers 31 and 32, respectively, which move in and out to change the direction of flow of oil through valves 18 and 19 in response to movement of cams 33 and 34, which are mounted on shaft 35 turned by speed ranger 36 powered by motor 15. The hopper knife 24 and dough plunger 25 are moved to their forward position as shown in full lines in Figures 1 and 6 when the pistons 22 and 23, respectively, are pushed forward by oil under pressure entering the rearward end of cylinders 20 and 21, respectively, through pipes 26 and 29, respectively, while oil in the forward end of the cylinders is exhausted at the same time through pipes 27 and 30, respectively. When the valves 18 and 19 are reversed, oil is pumped under pressure into the forward end of the cylinders 20 and 21 through pipes 27 and 30, respectively, thereby moving the pistons 22 and 23, respectively, the hopper knife 24, and the dough plunger 25 to their rearward positions as shown in dotted lines in Figures 6. The oil in the rearward end of these cylinders is at the same time exhausted through the pipes 26 and 29, through valves 18 and 19 and pipes 37 and 38, which connect the valves 18 and 19 to the tank 10.

The cover 9 is provided with an opening through which dough hopper 39 extends and the upper portion of the hopper 39 is provided with a flange 40 for engaging the upper surface of the cover 9. The dough hopper 39 is provided with top and bottom openings 41 and 42, respectively, for the entrance and exit of the dough to be divided. Immediately below hopper 39 is provided a dough receiving chamber 43 which receives dough from said hopper 39, through chamber entrance 44. Chamber 43 is provided with a dough exit 45 through which the dough is pushed by plunger 25. The horizontally reciprocating hopper knife 24 is mounted in slots 46 so as to move back and forth across the bottom opening 42 of hopper 39 and entrance 44 of chamber 43 in order to cut off portions of dough fed through said hopper 39 to the chamber 43. The horizontally reciprocating plunger 25 is mounted in chamber 43 and is provided to push the dough out of chamber 43 and through my novel dividing and molding head 47 which is removably mounted in frame 48 immediately adjacent the exit 45 of chamber 43. The plunger 25 is provided at its rear end with a rearwardly extending lug 49 which trips the switch 50 when the plunger 25 is at the rearward end of its stroke.

The dividing and molding head 47 is provided with dough entrance and exit portions 51 and 52, respectively. Over the exit portions 52 are provided a plurality of guillotine knives 53, one for each exit, for the purpose of cutting the dough into portions of desired weight. The knives 53 are actuated by solenoids 54 which are mounted on the front wall 4 and which are actuated electrically through switch 55, which is mounted on frame support 56 beneath chamber 43, to drop the knives, and through switch 50 to lift the knives. Below the exit portions 52 are provided weighing devices 57, each of which comprises a scale beam 58, pivoted in standard 59 and having at end 60 a rotating dough-receiving wheel 61 situated below exit 52 of head 47. At the other end 62 of scale beam 58 is provided a lug 63, which is adapted, when end 62 is tipped up, to trip the switch 55 which drops the knife 53. A counterweight 64 is slidably mounted on scale beam 58 to determine the response of the scale beam 58 to various weights of dough received by wheel 61. Below the wheels 61 is provided a multiple pan 65 to receive the dough from wheels 61.

To describe the dividing and molding head 47 more in detail, reference is had to Figures 1, 3 and 4. The body portion 66 of the head 47, as shown in Figure 3 in elevation, is rectangular in shape and at one end 67 a rectangular opening therein provides a hand-hold 68 for convenience in sliding said head 47 into and out of assembly with frame 48. The body portion 66 is provided with a dough entrance portion 51 having a large rectangular opening 69, and a dough exit portion 52 having a plurality of openings 70. Extending from the dough entrance portion 51 to the dough exit portion 52 are a plurality of passages 71. To form the passages 71, the body portion is provided with relatively straight horizontal bottom walls 72, top walls 73, side walls 74, and 75, and spaced partition walls 76 intermediate the side walls 74 and 75. The partition walls 76 may have relatively thin spaced apart sections, as shown in the drawings, or may be a solid section intermediate the passages 71. The side walls, top walls, and partition walls are provided with substantially straight portions 77 adjacent the openings 70 of the exit portion 52 to define a relatively restricted portion 78 of the passages 71. The said walls are also provided with outwardly curved portions 79 to define relatively enlarged dough entrance portions 80 of the passages 71.

The partitions 76 are provided with arcuate portions 81 adjacent the dough entrance portion 51 which connect the outwardly curved portions 79 of the partition walls. As dough is pushed into the head 47 by the plunger 25, the dough moves against and past these arcuate portions 81 and is gently divided with no tearing, and then moves into the relatively enlarged portions 80 of the passages 71 and is gradually compressed into the relatively restricted portions 78 of the passages where it is given a kneading and molding treatment until it is pushed through the exit openings 70.

When a dough of a certain consistency is being worked, such as a heavy dough for making gluten bread, a different type of molding and dividing head 47 would be employed than if a dough of a light consistency was being molded and divided. It has been ascertained that when a heavy type of dough is being worked that the molding and dividing head structure 47 should have entrance and discharge openings, such as 80 and 70 respectively, in such relationship that the areas of the entrance openings are in a ratio to the areas of the discharge openings of substantially one and one-half to one. With such a molding and dividing head structure the length of the passages therein, such as the passages 71, should be at least twice the transverse dimension of the entrance opening.

However, if a light dough is being worked the consistency of the dough would most likely be such that a head structure having a different ratio relationship between the areas of the entrance and discharge openings would be more effective and advantageous in producing properly molded and kneaded dough. Thus the areas of the entrance openings in the head structure in relation to the areas of the discharge openings could be in a ratio of substantially three to one while the length of the passages between said openings in the head structure would be at least twice the transverse dimension of the entrance opening.

It has been ascertained that if a heavy dough is being worked, wherein a head structure is employed having the areas of the entrance and discharge openings in a ratio relationship of approximately three to one, that a considerably greater pressure must be employed by the piston in forcing the dough through the entrance opening and into the passages of the head structure than would be necessary if the ratio of the areas of the entrance and discharge openings was less. The additional or greater pressure that is required with such a head structure tends to harm the dough by excessively compressing same so that the dough would have to pass through a recovery stage in order to build up the gas cells. However, in using a heavy dough and a head structure wherein the areas of the entrance and discharge openings are in a ratio of approximately one and one-half to one there is not such a large mass of dough in the entrance opening for delivery to the passages in the head structure thus the dough is not subjected to the severe punishment that would occur if a head structure was employed having a higher ratio relationship between the entrance and discharge openings. The passages 71 of the head structure converge gradually from the entrance portion to the exit or discharge openings and the major portion of the convergence is adjacent this entrance portion to effect a kneading of the dough as it is forced into the passages. The portion of the passages adjacent the discharge openings having a substantially uniform transverse cross-sectional area to effect a smoothing of the dough as it is forced from the passages through the discharge openings.

In the operation of the machine, hopper 39 is first filled with dough, hopper knife 24 and plunger 25, actuated by pistons 22 and 23, respectively, are drawn out of the dough receiving chamber 43 and a portion of dough drops by gravity down out of the hopper 39 through chamber entrance 44 into the chamber 43. Hopper knife 24 then is pushed across the bottom opening 42 of the hopper 39, cutting off the dough and sealing the bottom opening 42 of the hopper. The plunger 25, actuated by piston 23, then moves forward into chamber 43, pushing the dough before it into the dividing and molding head 47. As the dough is pushed against the well rounded arcuate portions 81 of partitions 76, it is divided into a plurality of sections, and is gently folded, stretched, and kneaded with no tearing or cutting as it proceeds through passages 71. Little pressure being required for this operation, the dough is not punished or caused to lose its gas bubbles. As the dough is pushed through the passages 71 it is well sealed and molded by the time it is pushed out of the passage exits 70, when it deposits on wheels 61 which turn slightly as the dough moves outwardly. When a predetermined weight of dough accumulates on each wheel, the weight overcomes the effect of the counterweight 64 and the scale beam 58 tips, the wheel moving downwardly and end 62 of the scale beam 58 moving upwardly until lug 63 trips switch 55 actuating solenoid 54 to move knife 53 downwardly across the passage exits 70 cutting off the correct weight of dough and sealing the dough at the same time. When the dough is thus severed, the weight of said dough actuates the wheel 61, to turn and deposit the dough into pan 65. The plunger 25 and the hopper knife 24 then move again out of chamber 43 whereupon the rearwardly extending lug 49 on the rear end of plunger 25 trips switch 50 which electrically actuates solenoid 54 to move knife 53 upwardly into starting position as shown in Figures 1 and 5, more dough dropping into chamber 43 and the entire operation being repeated.

It will be seen, from the foregoing description, that as there is little resistance to the passage of the dough, when pushed by the plunger through my novel dividing head, very little punishment of the dough will take place, and as there is no shearing of the dough as it is pushed over the well rounded division portions no loss of gas bubbles is caused by this operation, and the dough is well molded by the time it leaves the dividing head. The divided and scaled dough in pans can then be transferred into the steam chest for final proofing ready for baking, thus eliminating the three pieces of additional apparatus required by the present volumetric dividers, i. e., rounder, proofer, and molder.

Inasmuch as the dividing head of my invention is removable, it can be easily cleaned or replaced by one of slightly different shape to produce varying shapes of loaves, and varying types of bread products.

Although I have described and illustrated my invention in considerable detail, I do not wish to be limited to the exact and specific details thereof as shown and described, but I may use such modifications, substitutions, or equivalents thereof as are embraced within the scope of my invention or as are pointed out in the appended claims.

I claim:

1. In a bread dough dividing and molding machine having a dough chamber containing a reciprocatory piston for forcing the dough from the chamber through a discharge opening, the improvement comprising a molding head having dough contacting wall surfaces forming at least one tubular molding passage and having an entrance opening for receiving dough from said chamber and a dough discharge opening, the dough contacting wall surfaces of said passage being so formed that every peripheral change in direction thereof in every transverse cross section between said entrance and discharge openings lies in an arcuate path, the areas of said entrance and discharge openings being in the ratio of at least one and one-half to one and said passage being relatively long and of a length of at least twice the transverse dimension of said entrance opening and gradually converging from said entrance opening to said discharge opening, the major portion of the convergence being adjacent the entrance opening and the end portion of said passage adjacent the discharge opening having a substantially uniform transverse cross-sectional area and having in cross section throughout a wholly curvate contour, whereby to contract without abrupt restriction and thereby knead and smooth the dough to seal the surfaces of the dough without punishment as it is forced through said passage, means for freely receiving the dough as it is forced through the discharge opening, means for cleanly cutting the dough at the discharge opening, and means for periodically actuating said cutting means to sever the dough into sections ready for baking.

2. In a bread dough dividing and molding machine having a dough chamber containing a reciprocatory piston for forcing the dough from the chamber through a discharge opening, the improvement comprising a molding head having dough contacting wall surfaces forming at least one tubular molding passage and having an entrance opening for receiving dough from said chamber and a dough discharge opening, the dough contacting wall surfaces of said passage being so formed that every peripheral change in direction thereof in every transverse cross section between said entrance and discharge openings lies in an arcuate path, the areas of said entrance and discharge openings being in the ratio of substantially three to one and said passage being relatively long and of a length of at least twice the transverse dimension of said entrance opening and gradually converging from said entrance opening to said discharge opening, the major portion of the convergence being adjacent the entrance opening and the end portion of said passage adjacent the discharge opening having a substantially uniform transverse cross-sectional area and having in cross section throughout a wholly curvate contour, whereby to contract without abrupt restriction and thereby knead and smooth the dough to seal the surfaces of the dough without punishment as it is forced through said passage, means for freely receiving the dough as it is forced through the discharge opening, means for cleanly cutting the dough at the discharge opening, and means for periodically actuating said cutting means to sever the dough into sections ready for baking.

3. In a bread dough dividing and molding machine having a dough chamber containing a piston for forcing the dough from the chamber through a discharge opening, the improvement comprising a molding head having dough contacting wall surfaces forming at least one tubular molding passage and having an entrance opening for receiving dough from said chamber and a dough discharge opening, the dough contacting wall surfaces of said passage being so formed that every peripheral change in direction thereof in every transverse cross section between said entrance and discharge openings lies in an arcuate path, the area of the discharge opening of said head being proportionate to but less than the area of the entrance opening, and said passage being of a length of at least twice the transverse dimension of said entrance opening and gradually converging from said entrance opening to said discharge opening, the major portion of the convergence being adjacent the entrance opening and the end portion of said passage adjacent the discharge opening having a substantially uniform transverse cross-sectional area and having in cross section throughout a wholly curvate contour, whereby to contract without abrupt restriction and thereby knead and smooth the dough to seal the surfaces of the dough without punishment as it is forced through said passage, means for freely receiving the dough as it is forced through the discharge opening, means for cleanly cutting the dough at the discharge opening, and means for periodically actuating said cutting means to sever the dough into sections ready for baking.

References Cited in the file of this patent

UNITED STATES PATENTS

| | | |
|---|---|---|
| 361,313 | Muller | Apr. 19, 1887 |
| 729,149 | Fenn | May 26, 1903 |
| 871,650 | Streich | Nov. 19, 1907 |
| 1,378,662 | Di Domenica | May 17, 1921 |
| 1,783,287 | Hilgendorf | Dec. 2, 1930 |
| 2,437,460 | De Francisci | Mar. 9, 1948 |

FOREIGN PATENTS

| | | |
|---|---|---|
| 132,101 | Germany | June 27, 1902 |